(12) United States Patent
Kalos

(10) Patent No.: US 8,041,984 B2
(45) Date of Patent: Oct. 18, 2011

(54) REDUNDANCY INFORMATION FOR ADJUSTING THRESHOLD FOR COMPONENT FAILURE IN A MULTI-LAYER SYSTEM

(75) Inventor: Matthew Joseph Kalos, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 12/253,855

(22) Filed: Oct. 17, 2008

(65) Prior Publication Data

US 2010/0100764 A1  Apr. 22, 2010

(51) Int. Cl.
*G06F 11/00* (2006.01)
(52) U.S. Cl. .......................................................... 714/3
(58) Field of Classification Search .................. 714/3–8, 714/13, 15, 16, 18, 20, 21, 26, 31, 42–44, 714/47, 56
See application file for complete search history.

(56) References Cited

U.S. PATENT DOCUMENTS

| | | | |
|---|---|---|---|
| 5,491,786 A | 2/1996 | Egan et al. | |
| 6,886,108 B2 * | 4/2005 | Talagala | 714/5 |
| 7,117,397 B1 | 10/2006 | Kondo et al. | |
| 7,373,559 B2 * | 5/2008 | Guha | 714/54 |
| 2005/0114728 A1 * | 5/2005 | Aizawa et al. | 714/6 |
| 2005/0283655 A1 * | 12/2005 | Ashmore | 714/7 |
| 2009/0037676 A1 * | 2/2009 | Coronado et al. | 711/162 |

* cited by examiner

*Primary Examiner* — Nadeem Iqbal
(74) *Attorney, Agent, or Firm* — Rabindranath Dutta; Konrad Raynes & Victor LLP

(57) ABSTRACT

A first unit and a second unit are provided in a multi-layer computing system, wherein the first unit is at a higher layer than the second unit in the multi-layer computing system, and wherein the first unit is a higher level unit and the second unit is a lower level unit. The higher level unit sends to the lower level unit, information to adjust a threshold for failure of components coupled to the lower level unit, wherein the higher level unit has more information on a degree of redundancy in the multi-layer computing system than the lower level unit. The lower level unit adjusts the threshold for the failure of the components, by using the information sent from the higher level unit.

25 Claims, 9 Drawing Sheets

REDUNDANCY INFORMATION FOR ADJUSTING THRESHOLD FOR COMPONENT FAILURE IN A MULTI-LAYER SYSTEM

BACKGROUND

1. Field

The disclosure relates to a method, system, and article of manufacture for adjusting the threshold for component failure in a multi-layer system by using redundancy information.

2. Background

A multi-layer computing system may comprise a plurality of layers in which higher level layers may directly or indirectly exert partial control over lower level layers. For example, in a Redundant Array of Independent Disks (RAID) the RAID layer may be a higher level layer and the individual drive handling layer may be a lower level layer. In certain multi-layer computing systems, the plurality of layers may be arranged hierarchically.

Failures of components can occur in multi-layer computing systems. When a component fails, the failure of the component may impact the processing of operations in the multi-layer computing system. Additionally, the failure of one component can affect other components. Furthermore, events that take place in one layer can affect operations in another layer.

The plurality of layers of the multi-layer computing system may communicate with each other and exchange information. Different layers may possess different information about the state of the multi-layer operating system. Nevertheless, the plurality of layers may have to coordinate the operations of the different layers to enable the multi-layer computing system to function properly.

SUMMARY OF THE PREFERRED EMBODIMENTS

Provided are a method, a system, an article of manufacture, and a method for deploying computing infrastructure, in which a first unit and a second unit are provided in a multi-layer computing system, wherein the first unit is at a higher layer than the second unit in the multi-layer computing system, and wherein the first unit is a higher level unit and the second unit is a lower level unit. The higher level unit sends to the lower level unit, information to adjust a threshold for failure of components coupled to the lower level unit, wherein the higher level unit has more information on a degree of redundancy in the multi-layer computing system than the lower level unit. The lower level unit adjusts the threshold for the failure of the components, by using the information sent from the higher level unit.

In additional embodiments, a first threshold is a low threshold that is lower in comparison to a second threshold that is a high threshold, wherein a first degree of redundancy is high relative to a second degree of redundancy that is low. The multi-layer computing system is operated with the low threshold for the failure of the components, in response to determining that the degree of redundancy in the multi-layer computing system is of the first degree of redundancy that is high. The multi-layer computing system is operated with a high threshold for the failure of the components, in response to determining that the degree of redundancy in the multi-layer computing system is of the second degree of redundancy that is low.

In yet additional embodiments, the degree of redundancy may comprise a high, an intermediate, and a low degree of redundancy, wherein the adjusting of the threshold for the failure of the components by the lower level unit provides a balance between: (a) the degree of redundancy available in the multi-layer computing system; and (b) recovery time from failure for the components coupled to the lower level unit in the multi-layer computing system.

In further embodiments, the multi-layer computing system is a Redundant Array of Independent Disks (RAID) system. The higher level unit is a RAID layer and the lower level unit is an individual drive handling layer, wherein the components are disks, and wherein the threshold for failure of the disks in the individual drive handling layer is lowered, in response to redundancy in the RAID system being restored by replacing a failed disk.

In still further embodiments, the multi-layer computing system comprises a plurality of lower level units, wherein the higher level unit is a host. A first lower level unit of the plurality of lower level units is a primary storage control unit. A second lower level unit of the plurality of lower level units is a secondary storage control unit, wherein data in the primary storage control unit is copied to the secondary storage control unit. A controller swapping application is included in the host, wherein the controller swapping application is able to redirect Input/Output (I/O) operations being performed with respect to the primary storage control unit to the secondary storage control unit, in response to a failure of the primary storage control unit, and wherein the host provides the information to adjust the threshold for failure of components in the primary and the secondary storage control unit.

BRIEF DESCRIPTION OF THE DRAWINGS

Referring now to the drawings in which like reference numbers represent corresponding parts throughout.

DETAILED DESCRIPTION

Figure 1:
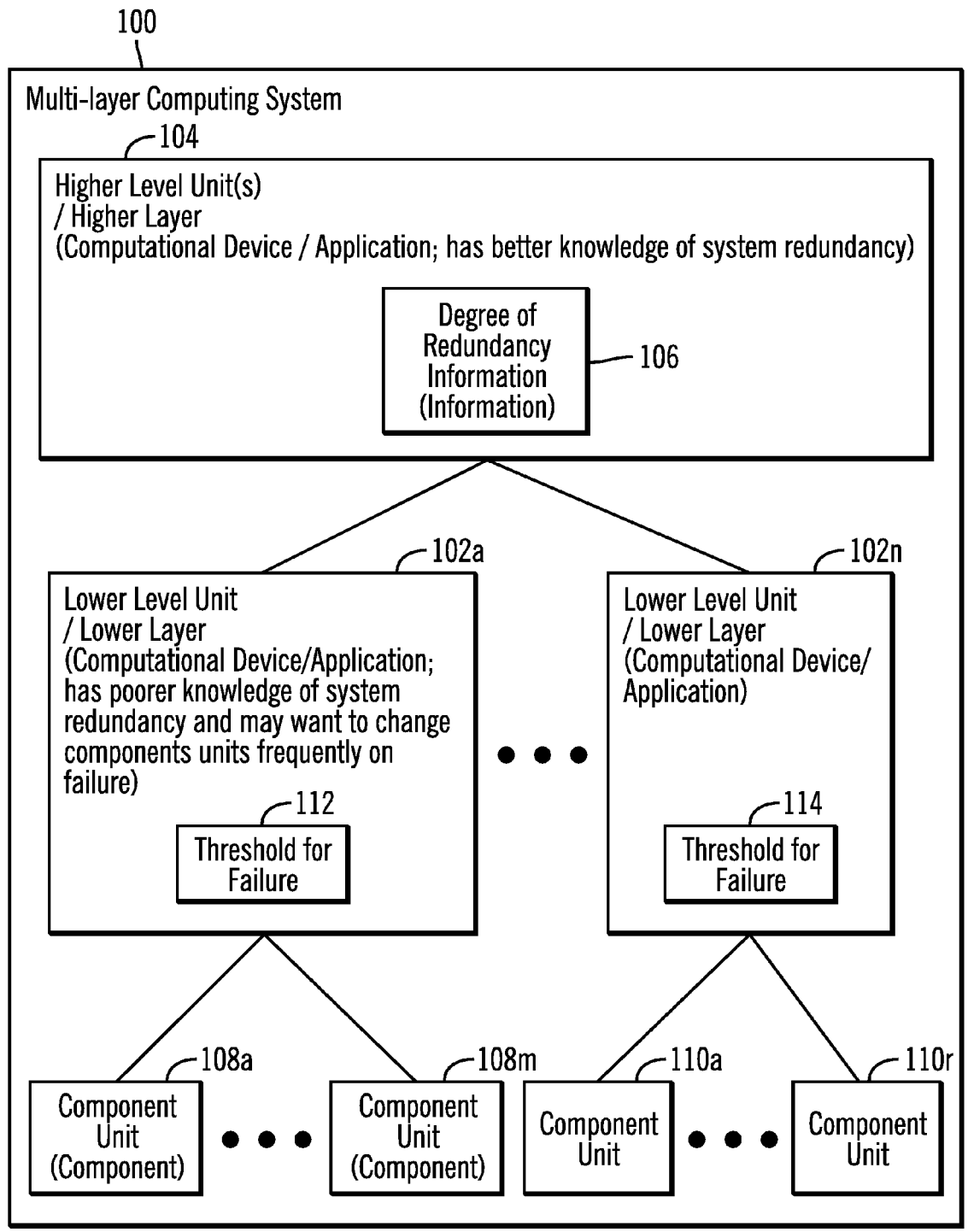
FIG. 1 illustrates a block diagram of a multi-layered computing system in which a plurality of lower level units are coupled to one or more exemplary higher level units, in accordance with certain embodiments.

In the following description, reference is made to the accompanying drawings which form a part hereof and which illustrate several embodiments. It is understood that other embodiments may be utilized and structural and operational changes may be made.

Redundancy and component failures

Computing systems may have to balance two competing issues when deciding when to fail a hardware or software component. Applications may prefer a good response time, even when components fail. This argues for low error thresholds for components and fast failure of components in order to allow redundant parts of the system to be swapped in. On the other hand, systems may be built using layered approaches. The lower layers of the system may deal with failures of the components managed by the lower layers. However, the lower layers may not have adequate visibility of the redundancy information of the system that is available at the higher layers of the system. This argues for a high error threshold for components since the lower layers do not know whether there is redundancy available at the higher layers of the system.

For example, in a RAID system, there may be a drive layer of the system, wherein the drive layer handles individual drives. The drive layer is responsible for the read/write commands to individual drives, retry of errors, and thresholding of error indications from the drives. There is also a RAID layer of the system, wherein the RAID layer is aware of the data and parity components that are part of the RAID array. The RAID layer is responsible for performing RAID level recovery after a permanent drive failure. The drive layer tends to want to have high failure thresholds because the drive layer is not aware of whether or not the RAID level has adequate redundancy. Premature failure of a drive may cause data loss if the RAID level does not have adequate data and parity members to reconstruct the data on the failed drive.

In a hyperswap environment, two storage controllers are configured where a remote controller is the synchronous remote copy of a local controller. The hyperswap system component is capable of swapping application Input/Output (I/O) to the remote controller when a failure is detected in the local controller. On the other hand, the controllers are typically designed to perform maximum retries and error recoveries since the controllers do not know whether there is adequate redundancy available at the higher levels of the system.

In certain embodiments, the higher levels of the system provide redundancy hints to the lower levels of the system so that the low levels of the system can tailor the failure thresholds in the lower levels of the system to secure a better balance between maintaining system redundancy and providing fast recovery times.

In the RAID example, the RAID level of the system may communicate to each member component what level of redundancy was available for an array or parity group. For example, in a RAID-6 array, the redundancy may be specified as dual redundancy if all drives are available, a single redundancy may be specified after one drive failure, and no redundancy may be specified after two drive failures.

The underlying disk level may apply the lowest failure threshold when dual redundancy is available, and the highest (most tolerant) failure threshold when no redundancy is available. Each error threshold managed by the disk level may have a single or multiple level of failure threshold.

For the hyperswap case, the hyperswap capable host may communicate to the two controllers about the available level of redundancy and the controllers (the lower layer of the system) may select the appropriate failure thresholds similar to the way the disk layer selected failure thresholds in the RAID environment.

Exemplary Embodiments

FIG. 1 illustrates a block diagram of a multi-layered computing system 100 in which a plurality of lower level units 102a . . . 102n are coupled to one or more exemplary higher level units 104, in accordance with certain embodiments. While blocks representing only two lower level units and one higher level unit are shown in FIG. 1, in alternative embodiments a greater or a fewer number of lower and higher level units may be present.

The higher level unit 104 may comprise a computational device or an application that has a better knowledge of system redundancy in the multi-layered computing system 100 in comparison to the lower level units which may also comprise a computational device or an application. In certain embodiments, a computational device corresponding to the higher level unit 104 and the lower level units 102a . . . 102n may comprise any suitable computational device known in the art, including a mainframe computer, a mini computer, a personal computer, a server, a client, a host, a telephony device, a controller, etc. Applications corresponding to the lower layer units 102a . . . 102n and the higher layer units 104 may be implemented in hardware, firmware, software or any combination thereof.

The higher level units 104 may be in possession of a better knowledge of system redundancy in comparison to the lower level units 102a . . . 102n, wherein a redundant system is a system that may continue to operate even when a limited number of units or components of the system fail. The degree of redundancy information 106 shown in the higher level unit 104 represents a data structure that stores the degree of redundancy information of the multi-layer computing system 100 known to the higher level unit 104.

The lower level units 102a . . . 102n may have a poorer knowledge of system redundancy. A plurality of component units 108a . . . 108m, 110a . . . 110r may be included in or coupled to the lower level units 102a . . . 102n. In certain embodiments, the lower level units 102a . . . 102n have a poorer knowledge of the degree of redundancy available in the multi-layer computing system 100 and may want to change the component units 108a . . . 108m, 110a . . . 110r relatively more frequently (in comparison to the higher level unit 104), in response to one or more failures of the component units 108a . . . 108m, 110a . . . 110r. Data structures referred to as threshold for failure 112, 114 may be included in the lower level units 102a . . . 102n, wherein a low threshold for failure for a lower level unit indicates that component units included in or coupled to a lower level unit should be allowed to fail more easily in comparison to a situation in which a high threshold for failure is indicated.

Therefore, FIG. 1 illustrates a multi-layer computing system 100 in which higher level units 104 possess a degree of redundancy information 106 that is transmitted to the lower level units 102a . . . 102n. The lower level units 102a . . . 102n use the received degree of redundancy information to adjust the thresholds for failure 112, 114 in the lower level units.

Figure 2:
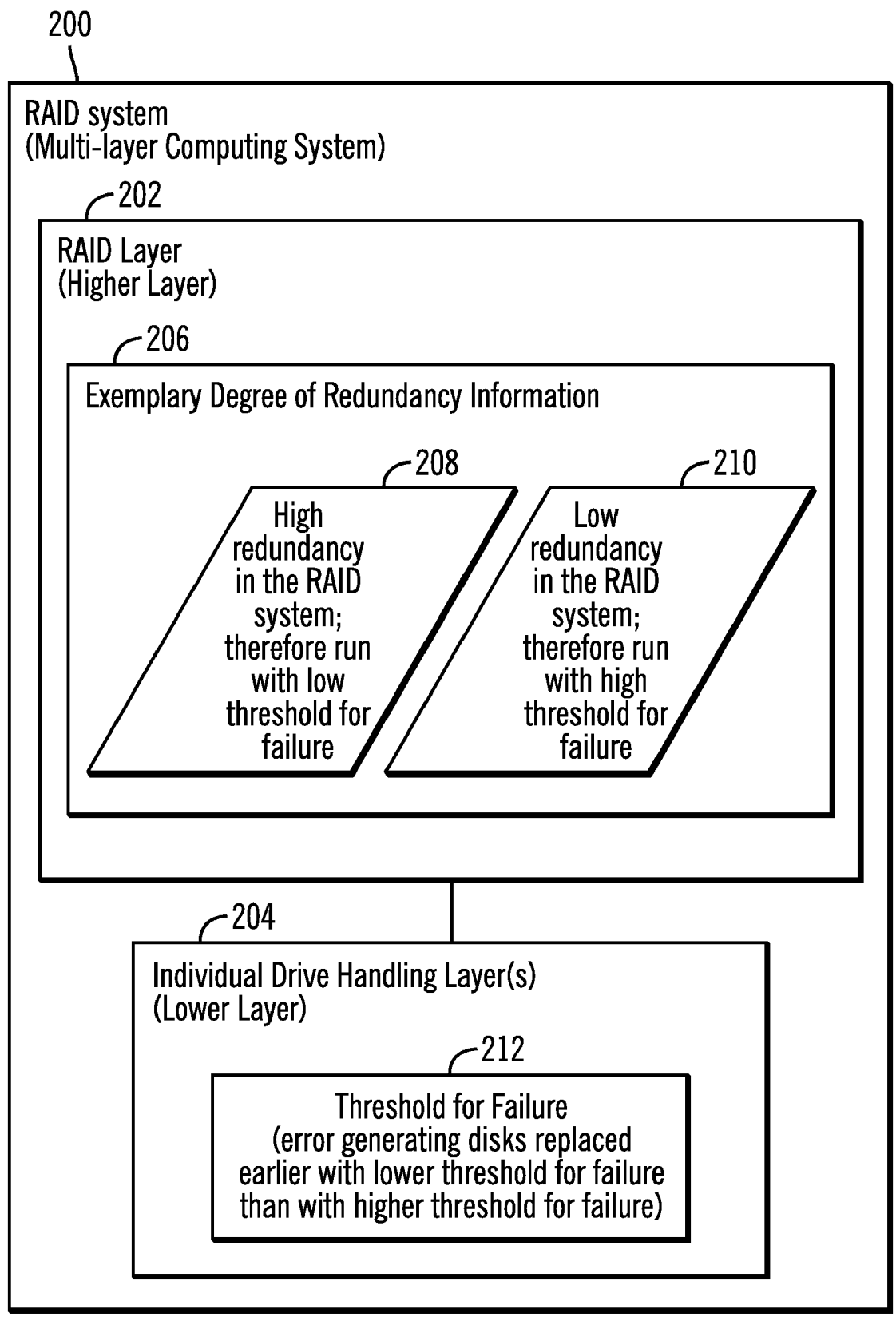
FIG. 2 shows a block diagram of a RAID system, in accordance with certain embodiments.

FIG. 2 shows a block diagram of a RAID system 200, in accordance with certain embodiments. In certain embodiments the RAID system 200 corresponds to the multi-layer computing system 100.

In the RAID system 200 the RAID layer 202 corresponds to the higher layer units 104 of the multi-layer computing system 100 of FIG. 1. The individual drive handling layers 204 in the RAID system 200 corresponds to the lower layer units 102a . . . 102n of the multi-layer computing system 100 of FIG. 1. For the purposes of the disclosure, the RAID layer 202 may be referred to as a higher layer and the individual drive handling layers 204 may be referred to as lower layers.

The RAID 202 includes an exemplary degree of redundancy information 206, wherein if there is high redundancy in the RAID system 200 then the RAID layer 202 sends information 208 to the individual drive handling layers 204 to run with a low threshold for failure, wherein the threshold for failure 212 is shown as a data structure within the individual drive handling layers 204. However, if there is low redundancy in the RAID system 200 then the RAID layer 202 sends information 210 to the individual drive handling layers 204 to run with a high threshold for failure. In the context of the RAID system 200, the individual drive handling layers 204 may replace error generating disks earlier with lower threshold for failure than with higher threshold for failure.

Figure 3:
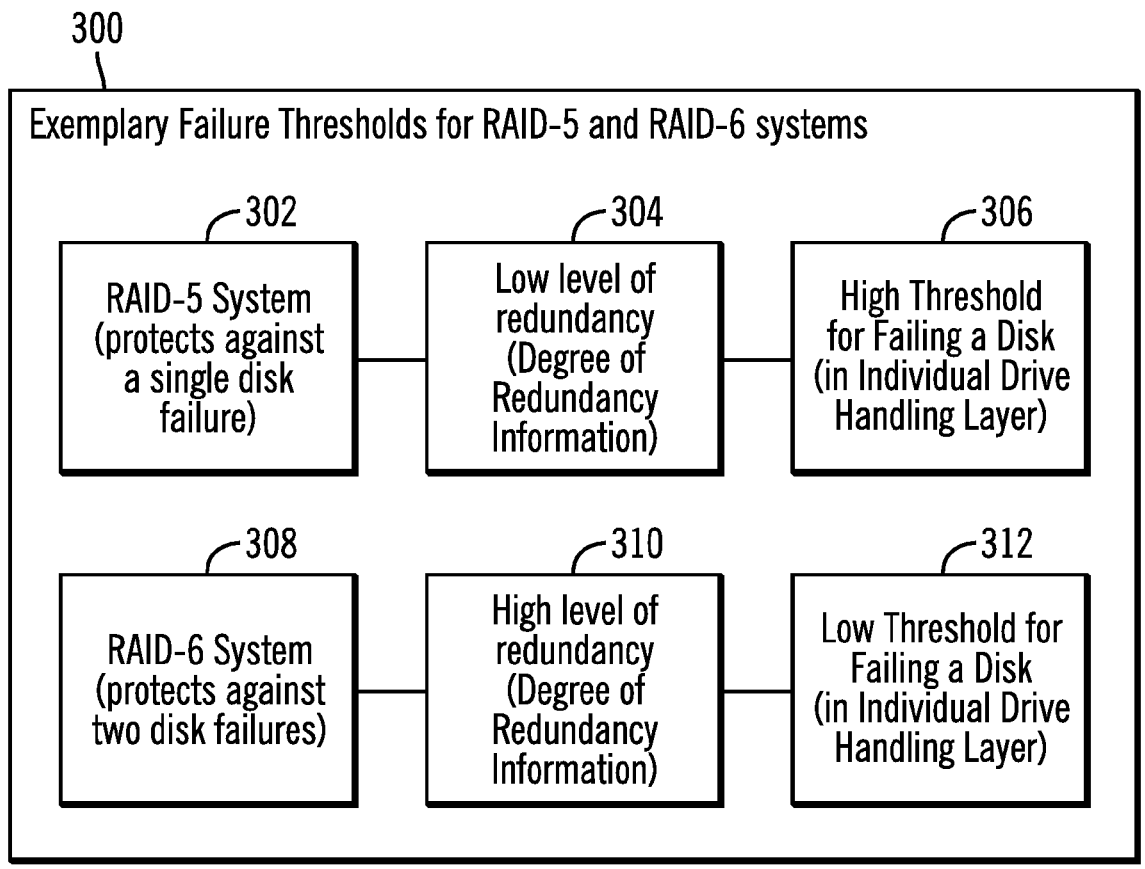
FIG. 3 illustrates a block diagram that shows exemplary failure thresholds in RAID-5 and RAID-6 systems, in accordance with certain embodiments.

FIG. 3 illustrates a block diagram 300 that shows exemplary failure thresholds in exemplary RAID-5 and exemplary RAID-6 systems, in accordance with certain embodiments. FIG. 3 is an illustrative example, and other types of RAID systems may be used to illustrate failure thresholds.

In FIG. 3 it is shown that a RAID-5 system 302 that protects against a single disk failure may have a low level of redundancy 304 (i.e., the degree of redundancy information 106 may be set to be low) and there is a high threshold 306 for failing a disk in individual drive handling layers. Alternately, a RAID-6 system 308 that protects against two disk failures may have a high level of redundancy 310 (i.e., the degree of redundancy information 106 may be set to be high) and there is a low threshold 312 for failing a disk in individual drive handling layers. Therefore, in the illustrative example shown in FIG. 3 error generating disks may be replaced much faster in the RAID-6 system 308 than in the RAID-5 system 302.

Figure 4:
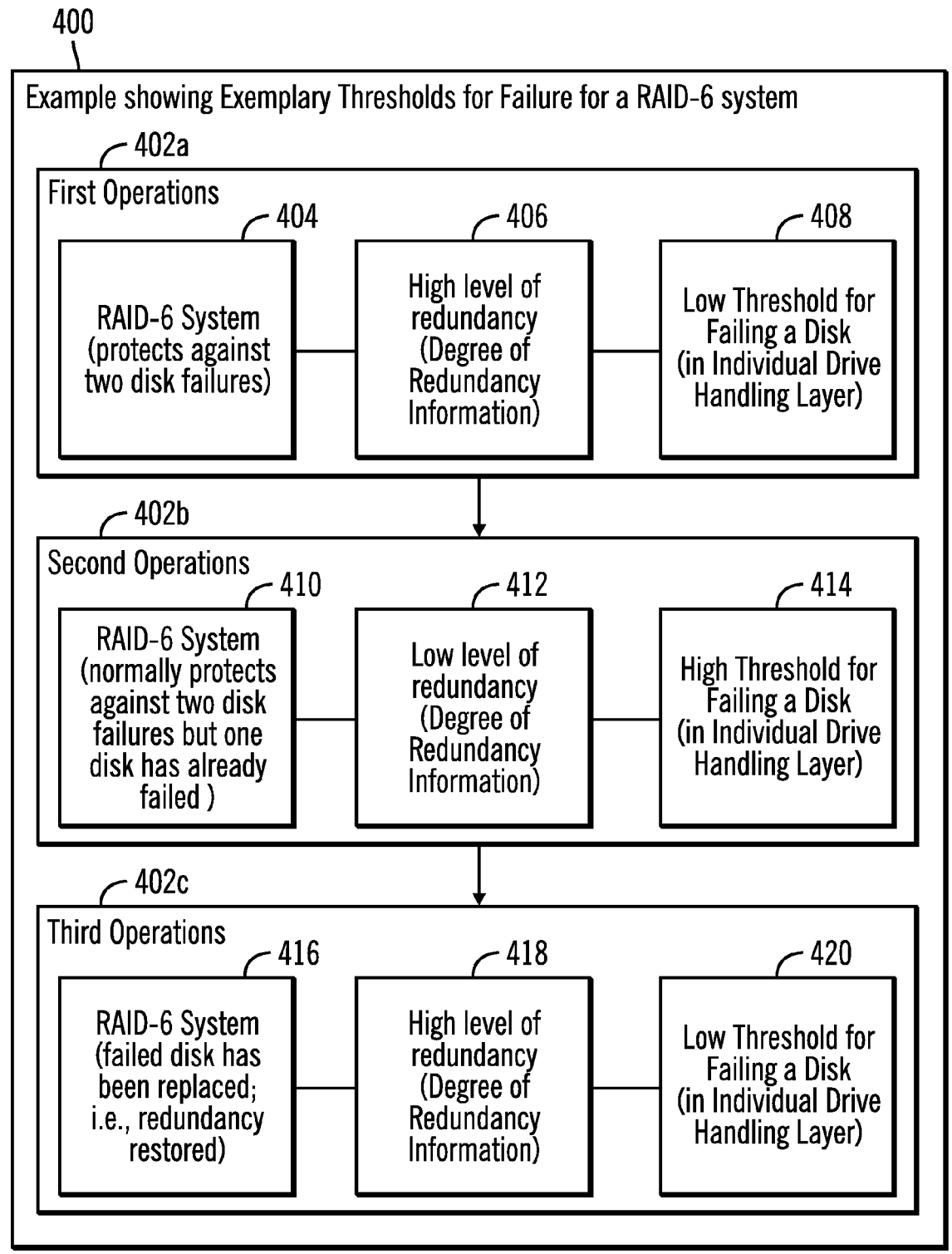
FIG. 4 illustrates a block diagram that shows exemplary failure thresholds in a RAID-6 system, in accordance with certain embodiments.

FIG. 4 illustrates a block diagram that shows an example 400 with first, second, and third operations (reference numerals 402a, 402b, 402c) for exemplary failure thresholds in a RAID-6 system, in accordance with certain embodiments.

In the first operations 402a, a RAID-6 system 404 that protects against two disk failures may have a high level of redundancy 406 (i.e., the degree of redundancy information 106 may be set to be high) and there is a low threshold 408 for failing a disk in individual drive handling layers.

A disk may fail in the RAID-6 system 404 and the RAID-6 system with one failed disk is shown in the block labeled second operations 402b. When a disk has failed, the RAID-6 system 410 that protects against one disk failure may have a low level of redundancy 412 (i.e., the degree of redundancy information 106 may be set to be low) and there is a high threshold 414 for failing a disk in individual drive handling layers.

After a period of time third operations 402c may be performed when the failed disk has been replaced in the RAID-6 system 416. The RAID-6 system 416 that again protects against two disk failures may have a high level of redundancy 418 (i.e., the degree of redundancy information 106 may be set to be high) and there may be a low threshold 420 for failing a disk in individual drive handling layers.

Therefore, FIG. 4 illustrates various transitions of the level of redundancy and thresholds as disks fail or are rebuilt/replaced in an exemplary RAID-6 system.

Figure 5:
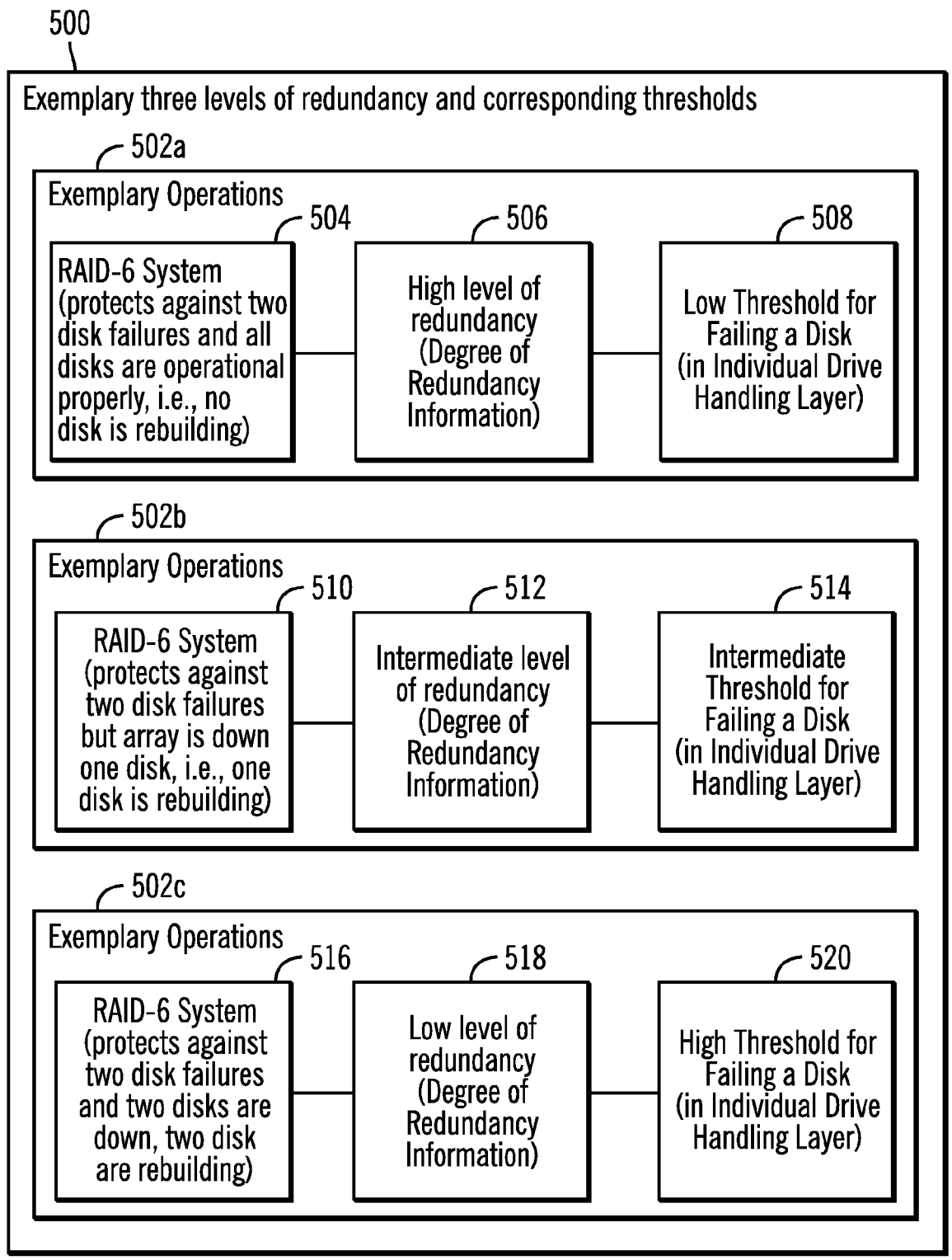
FIG. 5 illustrates a block diagram that shows three levels of redundancy and corresponding thresholds, in accordance with certain embodiments.

FIG. 5 illustrates a block diagram 500 that shows three levels of redundancy and corresponding thresholds, in accordance with certain embodiments.

In exemplary operations 502a, the RAID-6 system 502 that protects against two disk failures may have a high level of redundancy 506 (i.e., the degree of redundancy information 106 may be set to be high) and there may be a low threshold 508 for failing a disk in individual drive handling layers. The threshold 508 is low because the RAID-6 system 504 has no disk failures currently and can operate with as many as two failed disks.

In exemplary operations 502b, the RAID-6 system 510 that protects against two disk failures may have had a disk failure and therefore has an intermediate level of redundancy 512 (i.e., the degree of redundancy information 106 may be set at an intermediate level) and there may be an intermediate threshold 514 for failing a disk in individual drive handling layers. The threshold 514 is intermediate because with the RAID-6 system 504 having one disk failure currently, the RAID-6 system 504 can operate with at most one additional disk failure.

In exemplary operations 502d, the RAID-6 system 516 that protects against two disk failures may have had two disk failures and a low level of redundancy 518 (i.e., the degree of redundancy information 106 may be set at a low level) and there may be a high threshold 520 for failing a disk in individual drive handling layers. The threshold 520 is high because if another error-generating disk is made to fail then the RAID-6 system 516 may stop functioning.

Therefore, FIG. 5 provides an example in which the three levels of redundancy and corresponding threshold levels are shown. A greater or a few number of levels of redundancy or thresholds may be provided in alternative embodiments. Additionally, the number of levels of the redundancy many differ from the number of levels of the threshold for failure.

Figure 6:
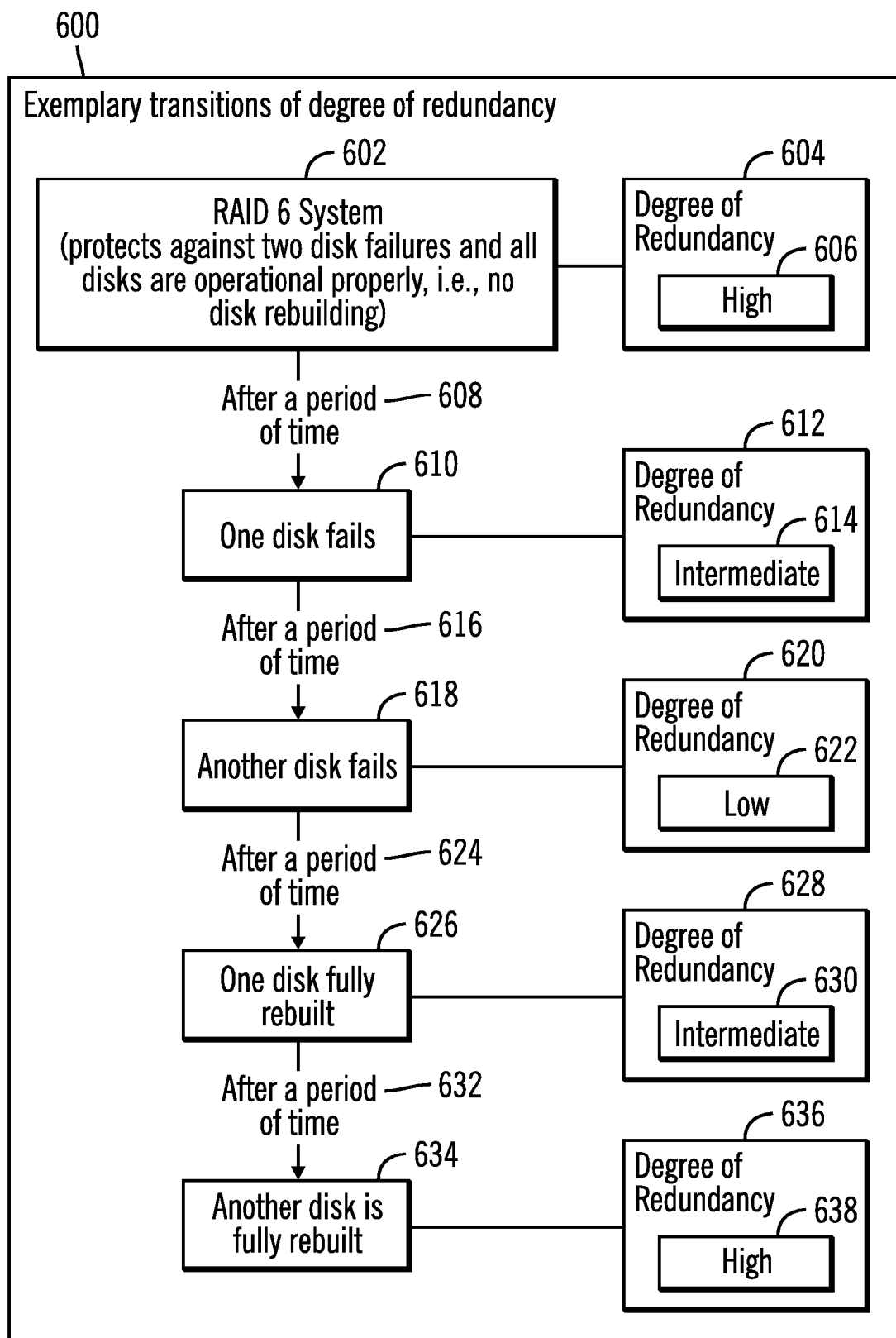
FIG. 6 illustrates a block diagram that shows exemplary transitions of the degree of redundancy, in accordance with certain embodiments.

FIG. 6 illustrates a block diagram that shows exemplary transitions 600 of the degree of redundancy, in accordance with certain embodiments.

A RAID system 602 protects against two disk failures and all disks are operating properly. As a result, the degree of redundancy 604 is set to be high 606. After a period of time 608, there is an event that causes (at block 610) one disk to fail. The degree of redundancy 612 is set to be intermediate 614. Subsequently, after a period of time 616, another disk fails (at block 618) and the degree of redundancy 620 is set to be low 622.

After a period of time 624, one disk is fully rebuilt (at block 626) and the degree of redundancy 628 is set to be intermediate 630. After another period of time 632, another disk is fully rebuilt (at block 634) and the degree of redundancy 636 is set to be high 638.

It should be noted that as the degree of redundancy is set, the thresholds for failures are also changed. Therefore, FIG. 6 illustrates exemplary transitions that can take place in the degree of redundancy in a multi-layer system that is configured as a RAID-6 system.

Figure 7:
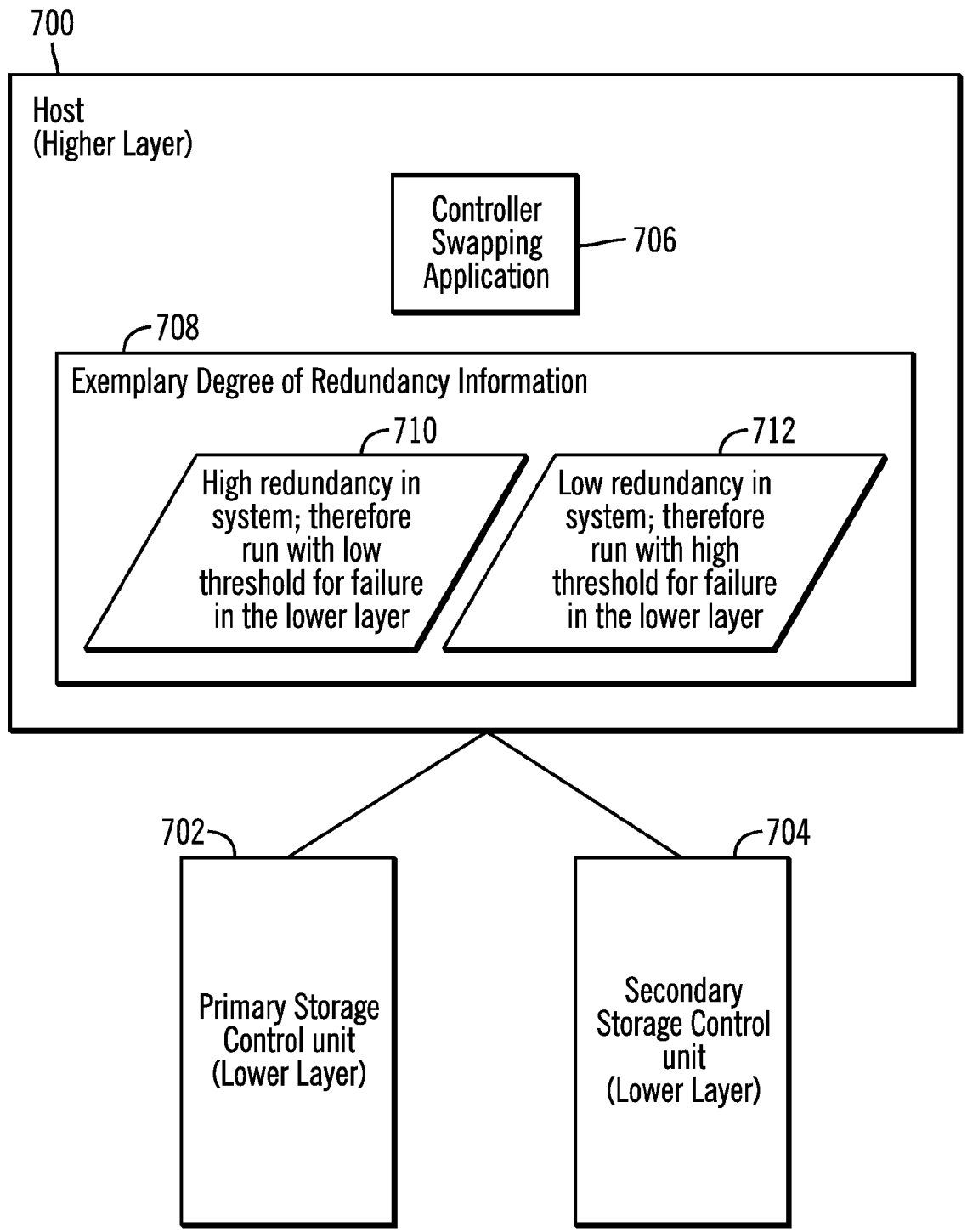
FIG. 7 illustrates a block diagram that shows a host at a higher layer coupled to a primary and a secondary storage control units at a lower layer, in accordance with certain embodiments.

FIG. 7 illustrates a block diagram that shows a host 700 at a higher layer coupled to a primary storage control unit 702 and a secondary storage control unit 704 at a lower layer, in accordance with certain embodiments.

In certain embodiments, in the multi-layer computing system 100 of FIG. 1 the plurality of lower level units 102a . . . 102n may be represented by the primary storage controller 702 and the secondary storage controller 702, and the higher level unit 104 may be represented by host 700.

In certain embodiments, data in the primary storage control unit 702 is copied to the secondary storage control unit 704. A controller swapping application 706 is included in the host 700 wherein the controller swapping application 706 is able to redirect Input/Output (I/O) operations being performed with respect to the primary storage control unit 702 to the secondary storage control unit 704, in response to a failure of the primary storage control 704.

In certain embodiments, the host 700 provides the information 708 to adjust the threshold for failure of components in the primary storage control unit 702 and the secondary storage control unit 704. For example, in certain embodiments, the host 700 determines (shown by reference numeral 710) that there is a high level redundancy in the system, and therefore the primary and the secondary storage control units 702, 704 should run with a low threshold for failure. In certain alternative embodiments, the host 700 determines (shown by reference numeral 712) that there is a low level of redundancy in system, and therefore the primary and the secondary storage control units 702, 704 should run with high threshold for failure.

Figure 8:
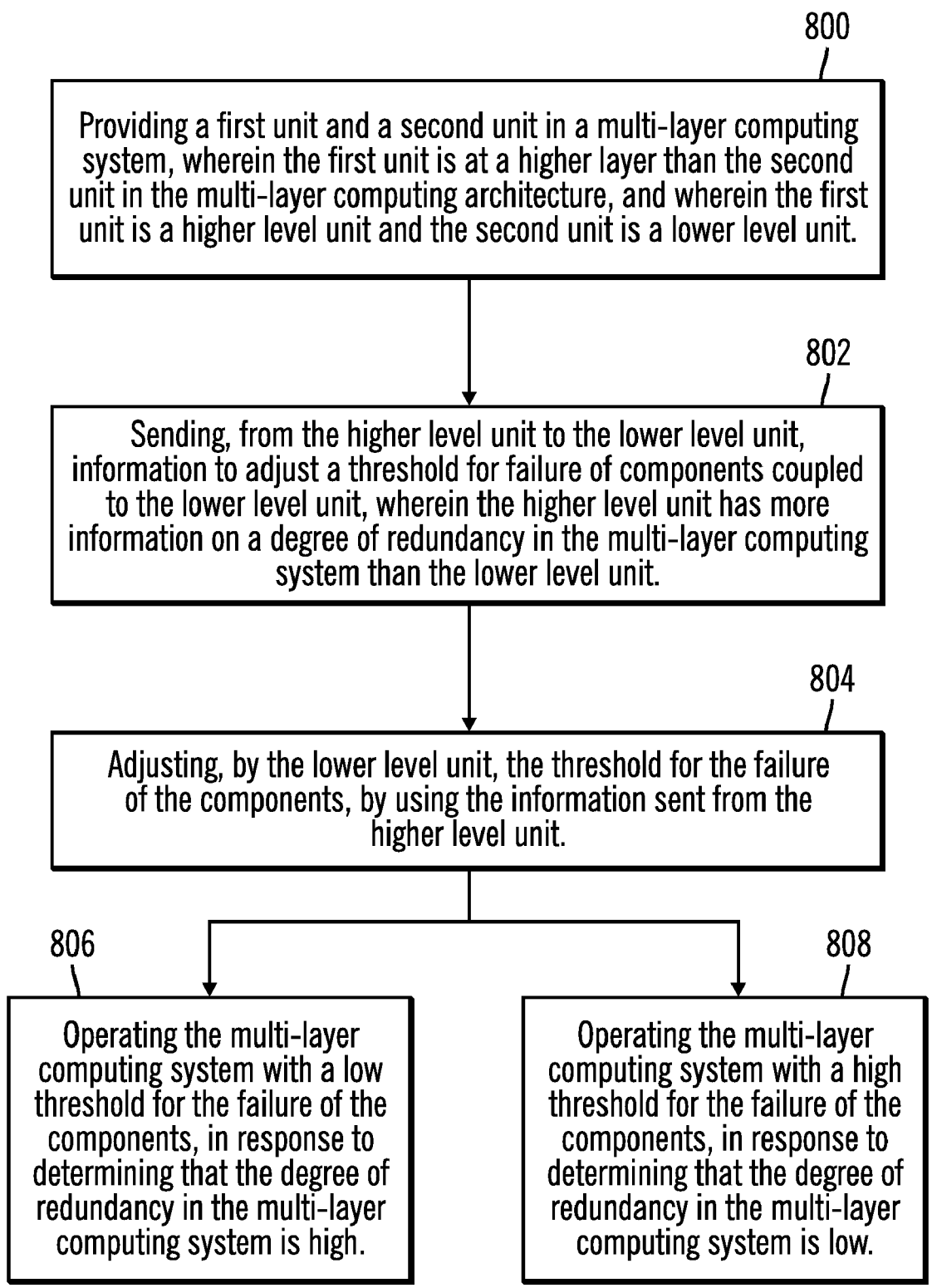
FIG. 8 illustrates a flowchart that shows operations performed in the multi-layer computing system of FIG. 1, in accordance with certain embodiments.

FIG. 8 illustrates a flowchart that shows operations performed in the multi-layer computing system 100 of FIG. 1, in accordance with certain embodiments. The operations shown in the flowchart may be performed in the computational devices 104, 102a . . . 102n shown in FIG. 1.

Control starts at block 800, in which a first unit 104 and a second unit 102a (in alternative embodiments a plurality of second units are provided) are provided in a multi-layer computing system 100, wherein the first unit 104 is at a higher layer than the second unit 102a in the multi-layer computing system 100. In certain embodiments, the first unit 104 is a higher level unit and the second unit 102a is a lower level unit.

Control proceeds to block 802, in which the higher level unit 104 sends to the lower level unit 102a, information 106 to adjust a threshold for failure 112 of components 108a . . . 108m coupled to the lower level unit 102a. The higher level unit 104 has more information on a degree of redundancy in the multi-layer computing system 100 than the lower level unit 104a. The lower level unit 104a adjusts (at block 804) the threshold for the failure 112 of the components 108a . . . 108m, by using the information sent from the higher level unit 104. From block 804, control proceeds in parallel to blocks 806 and 808.

At block 806, the multi-layer computing system 100 operates with a low threshold for the failure of the components 108a . . . 108m, in response to determining that the degree of redundancy in the multi-layer computing system 100 is high. At block 808, the multi-layer computing system 100 operates with a high threshold for the failure of the components 108a . . . 108m, in response to determining that the degree of redundancy in the multi-layer computing system 100 is low.

Therefore, FIGS. 1-8 illustrates certain embodiments, in which the adjusting of the threshold 112 (wherein the adjusting is based on the degree of redundancy information 106 received at the lower level unit 102a from the higher level unit 104) for the failure of the components 108a . . . 108m by the lower level unit 102a provides a balance between: (a) the degree of redundancy available in the multi-layer computing system 100; and (b) recovery time from failure for the components 108a . . . 108m coupled to the lower level unit 102a in the multi-layer computing system 100.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 9:
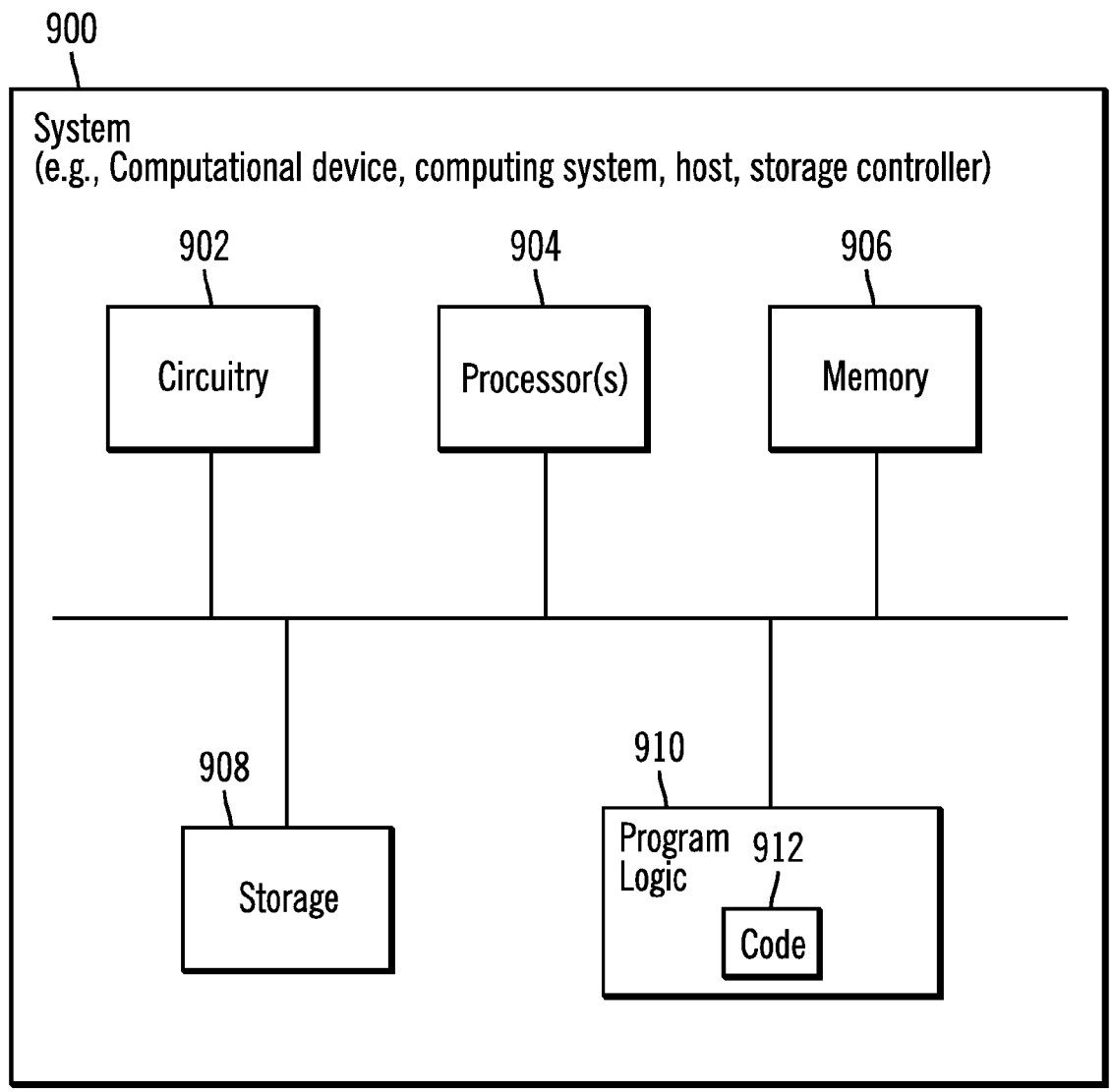
FIG. 9 illustrates a block diagram that shows certain elements that may be included in the higher and lower level units of the multi-layer computing system of FIG. 1, in accordance with certain embodiments.

FIG. 9 illustrates a block diagram that shows certain elements that may be included in the computational devices 102a . . . 102n, 104 of FIG. 1, in accordance with certain embodiments. One or more of the computational devices 102a . . . 102n, 104 either individually or collectively may also be referred to as a system 900, and may include a circuitry 902 that may in certain embodiments include a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-9 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-9 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    providing a first unit and a second unit in a multi-layer computing system, wherein the first unit is at a higher layer than the second unit in the multi-layer computing system, and wherein the first unit is a higher level unit and the second unit is a lower level unit;
    sending, from the higher level unit to the lower level unit, information to adjust a threshold for failure of components coupled to the lower level unit, wherein the higher level unit has more information on a degree of redundancy in the multi-layer computing system than the lower level unit, wherein the threshold for failure of components coupled to the lower level unit is maintained in a first data structure in the lower level unit, and wherein the information on the degree of redundancy in the multi-layer computing system is maintained in a second data structure in the higher level unit; and
    adjusting, by the lower level unit, the threshold for the failure of the components, by using the information sent from the higher level unit.

2. The method of claim 1, wherein a first threshold is a low threshold that is lower in comparison to a second threshold that is a high threshold, and wherein a first degree of redundancy is high relative to a second degree of redundancy that is low, the method further comprising:
    operating the multi-layer computing system with the low threshold for the failure of the components, in response to determining that the degree of redundancy in the multi-layer computing system is of the first degree of redundancy that is high; and
    operating the multi-layer computing system with a high threshold for the failure of the components, in response to determining that the degree of redundancy in the multi-layer computing system is of the second degree of redundancy that is low.

3. The method of claim 1, wherein the degree of redundancy may comprise a high, an intermediate, and a low degree of redundancy, and wherein the adjusting of the threshold for the failure of the components by the lower level unit provides a balance between:
    (a) the degree of redundancy available in the multi-layer computing system; and
    (b) recovery time from failure for the components coupled to the lower level unit in the multi-layer computing system.

4. The method of claim 1, wherein:
    the multi-layer computing system is a RAID system;
    the higher level unit that maintains the information on the degree of redundancy in the multi-layer computing system in the second data structure is a RAID layer;

the lower level unit that maintains the threshold for failure of components in the first data structure is an individual drive handling layer; and the components are disks, wherein the threshold for failure of the disks in the individual drive handling layer is lowered, in response to redundancy in the RAID system being restored by replacing a failed disk.

5. The method of claim 1, wherein the multi-layer computing system comprises a plurality of lower level units, and wherein:

the higher level unit is a host;

a first lower level unit of the plurality of lower level units is a primary storage control unit;

a second lower level unit of the plurality of lower level units is a secondary storage control unit, wherein data in the primary storage control unit is copied to the secondary storage control unit; and a controller swapping application in the host, wherein the controller swapping application is able to redirect Input/Output (I/O) operations being performed with respect to the primary storage control unit to the secondary storage control unit, in response to a failure of the primary storage control unit, and wherein the host provides the information to adjust the threshold for failure of components in the primary and the secondary storage control unit.

6. A multi-layer computing system, comprising:

a first unit; and a second unit, coupled to the first unit, wherein the first unit is at a higher layer than the second unit in the multi-layer computing system, and wherein the first unit is a higher level unit and the second unit is a lower level unit, wherein the multi-layer computing system is configured to perform:

sending, from the higher level unit to the lower level unit, information to adjust a threshold for failure of components coupled to the lower level unit, wherein the higher level unit has more information on a degree of redundancy in the multi-layer computing system than the lower level unit, wherein the threshold for failure of components coupled to the lower level unit is maintained in a first data structure in the lower level unit, and wherein the information on the degree of redundancy in the multi-layer computing system is maintained in a second data structure in the higher level unit; and adjusting, by the lower level unit, the threshold for the failure of the components, by using the information sent from the higher level unit.

7. The multi-layer computing system of claim 6, wherein a first threshold is a low threshold that is lower in comparison to a second threshold that is a high threshold, wherein a first degree of redundancy is high relative to a second degree of redundancy that is low, and wherein the multi-layer computing system is further configured to perform:

operating the multi-layer computing system with the low threshold for the failure of the components, in response to determining that the degree of redundancy in the multi-layer computing system is of the first degree of redundancy that is high; and operating the multi-layer computing system with a high threshold for the failure of the components, in response to determining that the degree of redundancy in the multi-layer computing system is of the second degree of redundancy that is low.

8. The multi-layer computing system of claim 6, wherein the degree of redundancy may comprise a high, an intermediate, and a low degree of redundancy, and wherein the adjusting of the threshold for the failure of the components by the lower level unit provides a balance between:

(a) the degree of redundancy available in the multi-layer computing system; and (b) recovery time from failure for the components coupled to the lower level unit in the multi-layer computing system.

9. The multi-layer computing system of claim 6, wherein:

the multi-layer computing system is a RAID system;

the higher level unit that maintains the information on the degree of redundancy in the multi-layer computing system in the second data structure is a RAID layer;

the lower level unit that maintains the threshold for failure of components in the first data structure is an individual drive handling layer; and the components are disks, wherein the threshold for failure of the disks in the individual drive handling layer is lowered, in response to redundancy in the RAID system being restored by replacing a failed disk.

10. The multi-layer computing system of claim 6, wherein the multi-layer computing system comprises a plurality of lower level units, and wherein:

the higher level unit is a host;

a first lower level unit of the plurality of lower level units is a primary storage control unit;

a second lower level unit of the plurality of lower level units is a secondary storage control unit, wherein data in the primary storage control unit is copied to the secondary storage control unit; and a controller swapping application in the host, wherein the controller swapping application is able to redirect Input/Output (I/O) operations being performed with respect to the primary storage control unit to the secondary storage control unit, in response to a failure of the primary storage control unit, and wherein the host provides the information to adjust the threshold for failure of components in the primary and the secondary storage control unit.

11. An article of manufacture, wherein code stored in the article of manufacture when executed by a processor performs operations, the operations comprising:

providing a first unit and a second unit in a multi-layer computing system, wherein the first unit is at a higher layer than the second unit in the multi-layer computing system, and wherein the first unit is a higher level unit and the second unit is a lower level unit;

sending, from the higher level unit to the lower level unit, information to adjust a threshold for failure of components coupled to the lower level unit, wherein the higher level unit has more information on a degree of redundancy in the multi-layer computing system than the lower level unit, wherein the threshold for failure of components coupled to the lower level unit is maintained in a first data structure in the lower level unit, and wherein the information on the degree of redundancy in the multi-layer computing system is maintained in a second data structure in the higher level unit; and adjusting, by the lower level unit, the threshold for the failure of the components, by using the information sent from the higher level unit.

12. The article of manufacture of claim 11, wherein a first threshold is a low threshold that is lower in comparison to a second threshold that is a high threshold, and wherein a first degree of redundancy is high relative to a second degree of redundancy that is low, the operations further comprising:

operating the multi-layer computing system with the low threshold for the failure of the components, in response to determining that the degree of redundancy in the multi-layer computing system is of the first degree of redundancy that is high; and operating the multi-layer computing system with a high threshold for the failure of the components, in response to determining that the degree of redundancy in the multi-layer computing system is of the second degree of redundancy that is low.

13. The article of manufacture of claim 11, wherein the degree of redundancy may comprise a high, an intermediate, and a low degree of redundancy, and wherein the adjusting of the threshold for the failure of the components by the lower level unit provides a balance between:
(a) the degree of redundancy available in the multi-layer computing system; and
(b) recovery time from failure for the components coupled to the lower level unit in the multi-layer computing system.

14. The article of manufacture of claim 11, wherein:
the multi-layer computing system is a RAID system;
the higher level unit that maintains the information on the degree of redundancy in the multi-layer computing system in the second data structure is a RAID layer;
the lower level unit that maintains the threshold for failure of components in the first data structure is an individual drive handling layer; and
the components are disks, wherein the threshold for failure of the disks in the individual drive handling layer is lowered, in response to redundancy in the RAID system being restored by replacing a failed disk.

15. The article of manufacture of claim 11, wherein the multi-layer computing system comprises a plurality of lower level units, and wherein:
the higher level unit is a host;
a first lower level unit of the plurality of lower level units is a primary storage control unit;
a second lower level unit of the plurality of lower level units is a secondary storage control unit, wherein data in the primary storage control unit is copied to the secondary storage control unit; and
a controller swapping application in the host, wherein the controller swapping application is able to redirect Input/Output (I/O) operations being performed with respect to the primary storage control unit to the secondary storage control unit, in response to a failure of the primary storage control unit, and wherein the host provides the information to adjust the threshold for failure of components in the primary and the secondary storage control unit.

16. A method for deploying computing infrastructure, comprising integrating computer-readable code into a multi-layer computing system, wherein the code in combination with the multi-layer computing system is capable of performing:
providing a first unit and a second unit in the multi-layer computing system, wherein the first unit is at a higher layer than the second unit in the multi-layer computing system, and wherein the first unit is a higher level unit and the second unit is a lower level unit;
sending, from the higher level unit to the lower level unit, information to adjust a threshold for failure of components coupled to the lower level unit, wherein the higher level unit has more information on a degree of redundancy in the multi-layer computing system than the lower level unit, wherein the threshold for failure of components coupled to the lower level unit is maintained in a first data structure in the lower level unit, and wherein the information on the degree of redundancy in the multi-layer computing system is maintained in a second data structure in the higher level unit; and
adjusting, by the lower level unit, the threshold for the failure of the components, by using the information sent from the higher level unit.

17. The method for deploying computing infrastructure of claim 16, wherein a first threshold is a low threshold that is lower in comparison to a second threshold that is a high threshold, and wherein a first degree of redundancy is high relative to a second degree of redundancy that is low, and wherein the code in combination with the multi-layer computing system is further capable of performing:
operating the multi-layer computing system with the low threshold for the failure of the components, in response to determining that the degree of redundancy in the multi-layer computing system is of the first degree of redundancy that is high; and
operating the multi-layer computing system with a high threshold for the failure of the components, in response to determining that the degree of redundancy in the multi-layer computing system is of the second degree of redundancy that is low.

18. The method for deploying computing infrastructure of claim 16, wherein the degree of redundancy may comprise a high, an intermediate, and a low degree of redundancy, and wherein the adjusting of the threshold for the failure of the components by the lower level unit provides a balance between:
(a) the degree of redundancy available in the multi-layer computing system; and
(b) recovery time from failure for the components coupled to the lower level unit in the multi-layer computing system.

19. The method for deploying computing infrastructure of claim 16, wherein:
the multi-layer computing system is a RAID system;
the higher level unit that maintains the information on the degree of redundancy in the multi-layer computing system in the second data structure is a RAID layer;
the lower level unit that maintains the threshold for failure of components in the first data structure is an individual drive handling layer; and
the components are disks, wherein the threshold for failure of the disks in the individual drive handling layer is lowered, in response to redundancy in the RAID system being restored by replacing a failed disk.

20. The method for deploying computing infrastructure of claim 16, wherein the multi-layer computing system comprises a plurality of lower level units, and wherein:
the higher level unit is a host;
a first lower level unit of the plurality of lower level units is a primary storage control unit;
a second lower level unit of the plurality of lower level units is a secondary storage control unit, wherein data in the primary storage control unit is copied to the secondary storage control unit; and
a controller swapping application in the host, wherein the controller swapping application is able to redirect Input/Output (I/O) operations being performed with respect to the primary storage control unit to the secondary storage control unit, in response to a failure of the primary storage control unit, and wherein the host provides the information to adjust the threshold for failure of components in the primary and the secondary storage control unit.

21. A system, comprising,
a memory; and
a processor coupled to the memory, wherein the processor performs operations, the operations comprising:
providing a first unit and a second unit in a multi-layer computing system, wherein the first unit is at a higher layer than the second unit in the multi-layer computing system, and wherein the first unit is a higher level unit and the second unit is a lower level unit;
sending, from the higher level unit to the lower level unit, information to adjust a threshold for failure of components coupled to the lower level unit, wherein the higher level unit has more information on a degree of redundancy in the multi-layer computing system than the lower level unit, wherein the threshold for failure of components coupled to the lower level unit is maintained in a first data structure in the lower level unit, and wherein the information on the degree of redundancy in the multi-laver computing system is maintained in a second data structure in the higher level unit; and
adjusting, by the lower level unit, the threshold for the failure of the components, by using the information sent from the higher level unit.

22. The system of claim 21, wherein a first threshold is a low threshold that is lower in comparison to a second threshold that is a high threshold, and wherein a first degree of redundancy is high relative to a second degree of redundancy that is a low, the operations further comprising:
operating the multi-layer computing system with the low threshold for the failure of the components, in response to determining that the degree of redundancy in the multi-layer computing system is of the first degree of redundancy that is high; and
operating the multi-layer computing system with a high threshold for the failure of the components, in response to determining that the degree of redundancy in the multi-layer computing system is of the second degree of redundancy that is low.

23. The system of claim 21, wherein the degree of redundancy may comprise a high, an intermediate, and a low degree of redundancy, and wherein the adjusting of the threshold for the failure of the components by the lower level unit provides a balance between:
(a) the degree of redundancy available in the multi-layer computing system; and
(b) recovery time from failure for the components coupled to the lower level unit in the multi-layer computing system.

24. The system of claim 21, wherein:
the multi-layer computing system is a RAID system;
the higher level unit that maintains the information on the degree of redundancy in the multi-layer computing system in the second data structure is a RAID layer;
the lower level unit that maintains the threshold for failure of components in the first data structure is an individual drive handling layer; and
the components are disks, wherein the threshold for failure of the disks in the individual drive handling layer is lowered, in response to redundancy in the RAID system being restored by replacing a failed disk.

25. The system of claim 21, wherein the multi-layer computing system comprises a plurality of lower level units, and wherein:
the higher level unit is a host;
a first lower level unit of the plurality of lower level units is a primary storage control unit;
a second low level unit of the plurality of lower level units is a secondary storage control unit, wherein data in the primary storage control unit is copied to the secondary storage control unit; and
a controller swapping application in the host, wherein the controller swapping application is able to redirect Input/Output (I/O) operations being performed with respect to the primary storage control unit to the secondary storage control unit, in response to a failure of the primary storage control unit, and wherein the host provides the information to adjust the threshold for failure of components in the primary and the secondary storage control unit.

\* \* \* \* \*